(12) United States Patent
Poehls et al.

(10) Patent No.: US 12,320,439 B2
(45) Date of Patent: Jun. 3, 2025

(54) DART VALVE

(71) Applicant: SPM Oil & Gas Inc., Fort Worth, TX (US)

(72) Inventors: Justin Poehls, Glen Rose, TX (US); David Figgs, Fort Worth, TX (US)

(73) Assignee: SPM Oil & Gas Inc., Forth Worth, TX (US)

( * ) Notice: Subject to any disclaimer, the term of this patent is extended or adjusted under 35 U.S.C. 154(b) by 113 days.

(21) Appl. No.: 18/296,610

(22) Filed: Apr. 6, 2023

(65) Prior Publication Data

US 2024/0337325 A1 Oct. 10, 2024

(51) Int. Cl.
*F16K 15/06* (2006.01)
*F16K 27/02* (2006.01)

(52) U.S. Cl.
CPC ........ *F16K 27/0209* (2013.01); *F16K 15/063* (2013.01); *F16K 2200/501* (2021.08)

(58) Field of Classification Search
CPC ......... Y10T 137/7933; F16K 2200/502; F16K 15/063; F16K 27/0209; F16K 2200/501
See application file for complete search history.

(56) References Cited

U.S. PATENT DOCUMENTS

| | | | |
|---|---|---|---|
| 3,442,288 A * | 5/1969 | Scaramucci | F16K 15/063 285/31 |
| 5,713,291 A * | 2/1998 | Mull, Jr. | F23L 99/00 110/264 |
| 5,743,291 A * | 4/1998 | Nehm | E03C 1/08 137/454.2 |
| 7,357,145 B2 | 4/2008 | Soderberg | |
| 11,092,257 B2 | 8/2021 | Barrett | |
| 2001/0045231 A1 | 11/2001 | Monod | |
| 2021/0308694 A1 | 10/2021 | Clawson | |
| 2022/0325810 A1 | 10/2022 | Morris | |

FOREIGN PATENT DOCUMENTS

| | | |
|---|---|---|
| CN | 205244496 U | 5/2016 |
| JP | 5749893 B2 | 7/2015 |

* cited by examiner

*Primary Examiner* — P. Macade Nichols

(57) ABSTRACT

A dart valve comprises a valve housing. The valve housing comprises a valve inlet, a valve outlet, a housing wall and an aperture extending through the housing wall between the valve inlet and valve outlet. The dart valve further comprises a valve cartridge. The valve cartridge comprises a cartridge housing configured to allow fluid to flow therethrough from a cartridge inlet to a cartridge outlet; and a valve plunger slidably mounted in the cartridge housing and configured to selectively allow fluid to flow from the cartridge inlet to the cartridge outlet. The valve cartridge is configured to be inserted through the aperture for removably mounting the valve cartridge within the valve housing, in a mounted position, such that the valve inlet is in communication with the cartridge inlet, the cartridge outlet is in communication with the valve outlet and fluid is able to flow from the valve inlet to the valve outlet through the valve cartridge.

20 Claims, 5 Drawing Sheets

DART VALVE

TECHNICAL FIELD

The present disclosure relates to a dart valve, and a valve cartridge for mounting in a dart valve.

BACKGROUND

Check valves are used in the oil industry and other applications to allow fluid to flow in a single direction only, from an inlet to an outlet. An internal mechanism inside the check valve causes the valve to close when fluid would flow, against the intended direction, from the outlet to the inlet. The valve closes when fluid pressure is higher at the outlet side of the valve than the inlet side of the valve.

One such check valve is a dart valve, which comprises a dart shaped plunger biased to a closed position by a spring as part of its internal mechanism. The dart valve has benefits in that its internal components last longer before needing to be replaced. However, the internal components of the dart valve may be difficult to replace in a field setting, particularly if the replacement requires the dart valve to be removed from the piping to which it is attached in use and taking it to a repair area.

SUMMARY

An object of the present disclosure is to provide a dart valve with a configuration in which the internal components may be replaced easily, particularly when the dart valve is mounted to the piping to which the valve is connected in use.

The present disclosure is therefore generally directed towards a dart valve comprising a housing with an aperture in the housing wall, and a replaceable cartridge which may be inserted through the aperture and mounted within the housing to complete the dart valve. The replaceable cartridge comprises the internal components which may need replacing during the dart valve's service life. Since the cartridge can be replaced without removing the housing from the piping to which it is attached, replacement is significantly easier, quicker and can take place in situ.

The dart valve may comprise a locking member which is moveable along a longitudinal axis of the housing. The locking member may secure the replaceable cartridge in a mounted position to the housing.

The present disclosure provides a dart valve comprising a valve housing. The valve housing comprises a valve inlet, a valve outlet, a housing wall and an aperture extending through the housing wall between the valve inlet and valve outlet. The dart valve further comprises a valve cartridge. The valve cartridge comprises a cartridge housing configured to allow fluid to flow therethrough from a cartridge inlet to a cartridge outlet; and a valve plunger slidably mounted in the cartridge housing and configured to selectively allow fluid to flow from the cartridge inlet to the cartridge outlet. The valve cartridge is configured to be inserted through the aperture for removably mounting the valve cartridge within the valve housing, in a mounted position, such that the valve inlet is in communication with the cartridge inlet, the cartridge outlet is in communication with the valve outlet and fluid is able to flow from the valve inlet to the valve outlet through the valve cartridge.

There is further provided a dart valve comprising a valve housing. The valve housing comprises a housing wall defining a housing chamber extending from a valve inlet to a valve outlet; and an aperture extending through the housing wall and located between the valve inlet and valve outlet. The dart valve further comprises a valve cartridge mounted within the housing chamber and to the valve housing. The valve cartridge comprises a valve plunger slidably mounted in a cartridge chamber of the valve cartridge. The dart valve further comprises a locking member comprising a locking member chamber. The locking member is mounted within the housing chamber and mounted to the valve housing. The locking member and valve cartridge are mounted to one another. A flow path extends from the valve inlet, through the locking member chamber and cartridge chamber, to the valve outlet.

There is further provided a valve cartridge for mounting in a dart valve. The valve cartridge comprises a cartridge housing comprising a cartridge wall defining a cartridge chamber extending from a cartridge inlet to a cartridge outlet; and a valve plunger slidably mounted within the cartridge chamber and located between the cartridge inlet and the cartridge outlet. The valve cartridge further comprises a housing radial seal member extending around the circumference of the valve cartridge at a first end of the valve cartridge; and a locking member radial seal member extending around the circumference of the valve cartridge at a second end of the valve cartridge.

By way of example only, embodiments according to the present disclosure are now described with reference to, and as shown in, the accompanying drawings.

BRIEF DESCRIPTION OF THE DRAWINGS

FIG. 2b is a perspective view of the dart valve of FIG. 2a;

FIG. 3a is a perspective view of the valve cartridge for use in the dart valve of FIG. 2a;

FIG. 3b is a side elevation sectional view of the valve cartridge of FIG. 3a;

FIG. 5 is a rear elevation sectional view of the dart valve of FIG. 2a.

DETAILED DESCRIPTION

Figure 1:
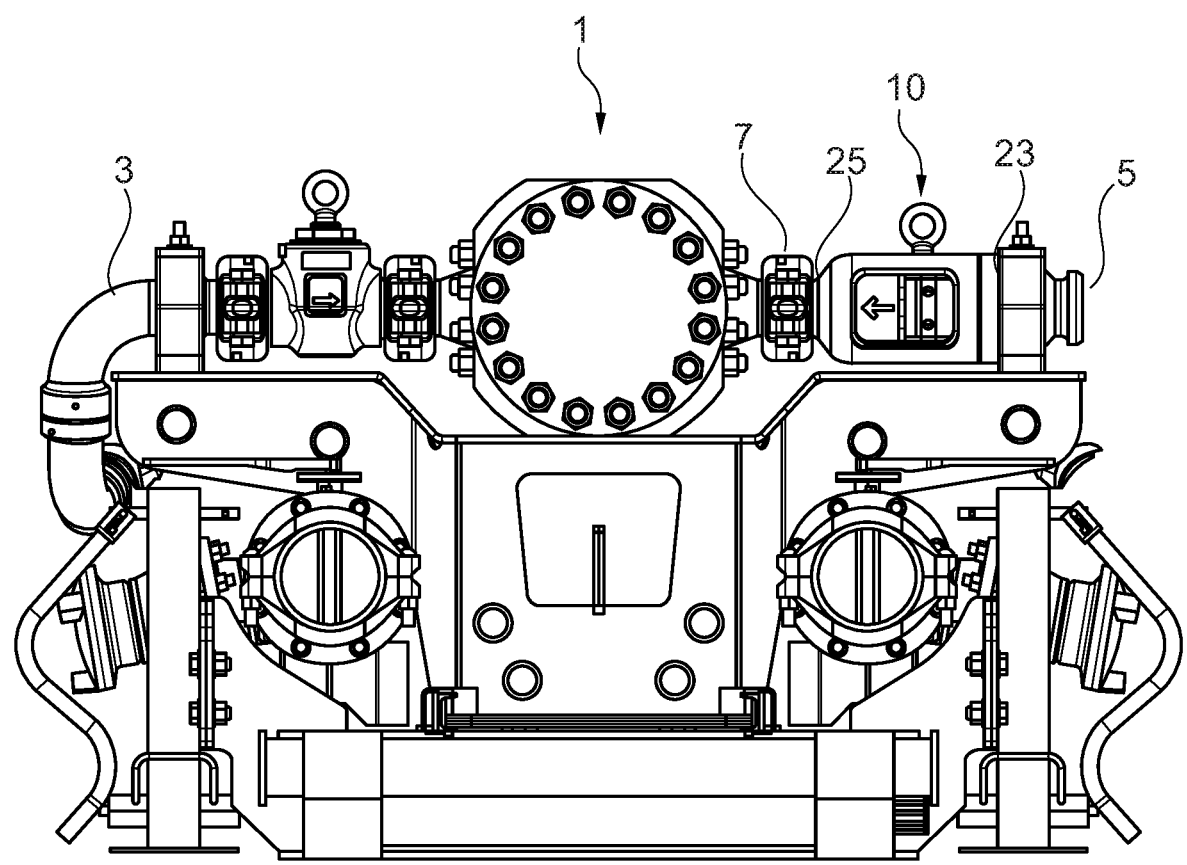
FIG. 1 is a side elevation of a fluid system for use with the dart valve of the present disclosure.

FIG. 1 illustrates an embodiment of a fluid system 1 comprising a dart valve 10. The fluid system 1 may comprise flow devices 3 connected to the dart valve 10. An inlet device 5 may be connected to a valve inlet 23 of the dart valve 10, and an outlet device 7 may be connected to a valve outlet 25 of the dart valve 10. The flow devices 3, including the inlet device 5 and outlet device 7, may be pipes and/or other devices, such as valves or pumps, which allow the flow of fluid therethrough.

The dart valve 10 may allow fluid to flow in one direction only from the valve inlet 23 to the valve outlet 25. The dart valve 10 may allow fluid to flow from the inlet device 5 to the outlet device 7. The dart valve 10 may prevent fluid from flowing from the outlet device 7 to the inlet device 5 and/or from flowing from the valve outlet 25 to the valve inlet 23.

Figure 2A:
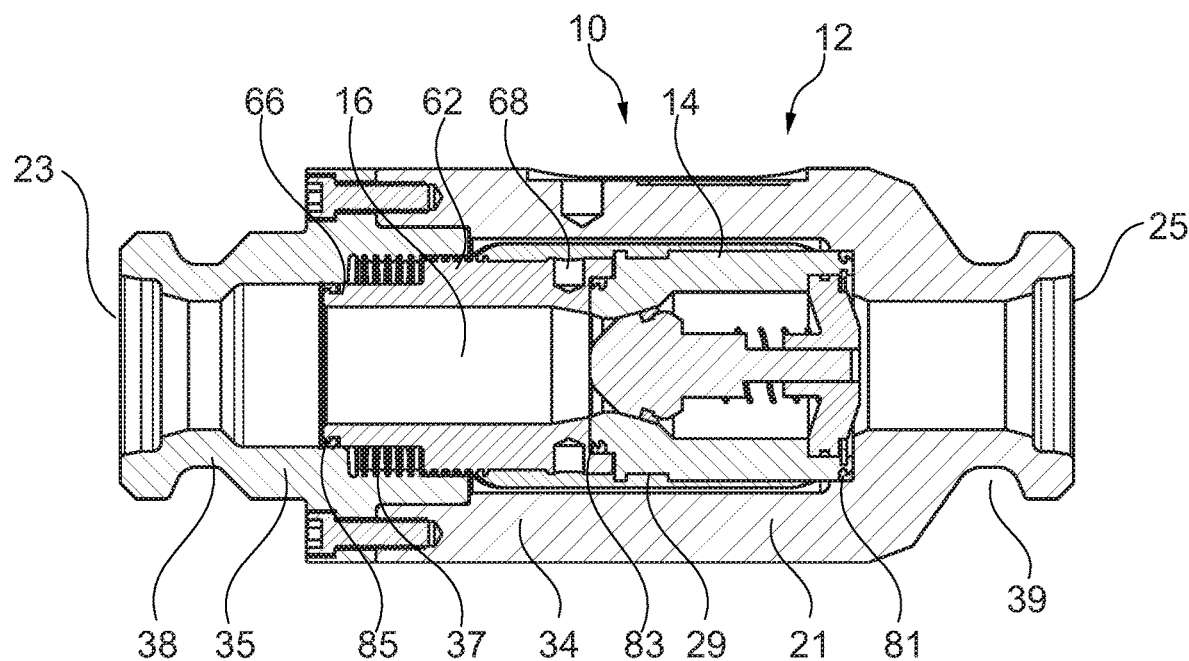
FIG. 2a is a side elevation sectional view of the dart valve of the present disclosure with a valve cartridge in a mounted position.

As shown in FIG. 2a, the dart valve 10 comprises a valve housing 12, a valve cartridge 14 and a locking member 16.

The valve housing 12 comprises a housing wall 21, a valve inlet 23, a valve outlet 25 and an aperture 27 (shown in FIG. 2*b*) extending through the housing wall 21. The aperture 27 is located between the valve inlet 23 and valve outlet 25.

The housing wall 21 defines a housing chamber 29 extending from the valve inlet 23 to the valve outlet 25. The housing wall 21 may be generally cylindrical in shape. The housing wall 21 may be a solid wall and/or a thin-walled tube. The housing wall 21 may be configured to surround the housing chamber 29. The housing wall 21 may be formed of multiple components but is generally referred to as the housing wall 21.

Figure 2B:
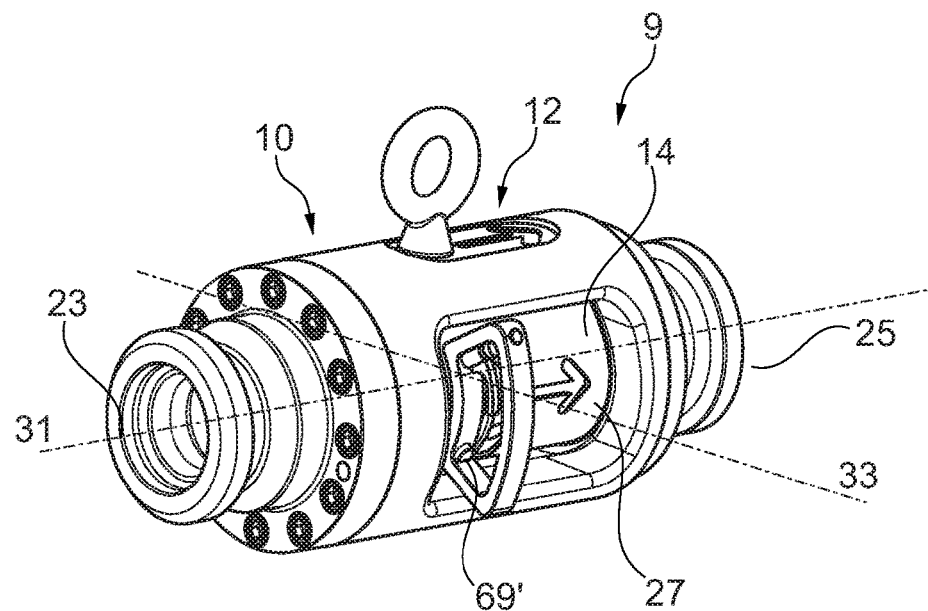

FIG. 2*b* shows the dart valve 10 in a fully assembled configuration and/or with the valve cartridge 14 and the locking member 16 in a mounted position. As shown in FIG. 2*b*, the dart valve 10 may generally extend from the valve inlet 23 to the valve outlet 25 along a longitudinal axis 31. The valve housing 12 and/or housing wall 21 may generally extend along the longitudinal axis 31. The housing chamber 29 may extend from the valve inlet 23 to the valve outlet 25 along the longitudinal axis 31. The aperture 27 may extend through the housing wall 21 in a radial direction 33. The radial direction 33 may be a direction perpendicular to the longitudinal axis 31.

The dart valve 10 may be configured for fluid to flow from the valve inlet 23 to the valve outlet 25 along a flow direction. The flow direction may be aligned with and/or the same as the longitudinal axis 31. A flow path may extend from the valve inlet 23 to the valve outlet 25. When in the mounted position, the flow path may be sealed and/or may be such that fluid may only flow between the valve inlet 23 and the valve outlet 25.

The valve housing 12 may be tubular and/or may have a generally cylindrical shape. The valve housing 12 may have a constant width, measured in the radial direction 33, along the majority of its length. The valve housing 12 may be elongate and/or have a greater length, measured along the longitudinal axis 31, than its width. The valve housing 12 may have a generally circular cross section. The valve housing 12 may have another shape, such as a rectangular, or hexagonal cross section. Because the flow path may pass through the valve cartridge 14 and locking member 16, the flow path may only be in contact with the valve housing 12 at the valve inlet 23 and valve outlet 25 and/or may not be in contact with the valve housing 12 between the valve inlet 23 and valve outlet 25. The valve housing 12 may not be a sealed housing and may rather comprise the valve inlet 23 and the valve outlet 25 and connection means, such as longitudinal members, bolts, rods and/or bars, extending therebetween such that the valve inlet 23 and the valve outlet 25 are fixed relative to one another. Therefore, the housing wall 21 does not need to be a single solid wall and may rather define the outer extent (in the radial direction 33) of the valve housing 12. The valve housing 12 may take any shape which allows the valve cartridge 14 to be mounted inside to create a flow path between the valve inlet 23 and the valve outlet 25.

The aperture 27 may have a rectangular shape and/or may have any shape which allows the valve cartridge 14 to be inserted therethrough. The aperture 27 may be sized such that the valve cartridge 14 may fit through and/or may be larger or slightly larger than the dimensions of the valve cartridge 14. The aperture 27 may extend along the longitudinal axis 31. The aperture need not be a hole extending through a solid wall, but rather any space through which the valve cartridge 14 may fit to be mounted within the valve housing 12.

The valve housing 12 may comprise a second aperture 28 (shown in FIG. 5) on the opposite side of the housing wall 21 to the aperture 27. The second aperture 28 may have the same dimensions as the aperture 27. The second aperture 28 may allow the valve cartridge 14 to be mounted to the valve housing 12 from different directions.

As shown in FIG. 2*a*, the valve housing 12 may comprise a main body 34 and an inlet sub body 35. The inlet sub body 35 may be attached to the main body 34 using fasteners such as screws and/or bolts. The main body 34 and the inlet sub body 35 may collectively form the housing wall 21 and the housing chamber 29. The aperture 27 may be defined in the main body 34. The valve inlet 23 may be defined in the inlet sub body 35. Forming the valve housing 12 from the main body 34 and the inlet sub body 35 may allow the dart valve 10 to be easily assembled in a factory setting by allowing the valve cartridge 14 to be inserted into the valve housing 12 from the inlet side of the main body 34. In addition, forming the valve housing 12 from the main body 34 and the inlet sub body 35 may allow the locking member 16 to be easily assembled into the dart valve 10 from the inlet side of the main body 34.

The valve housing 12 may comprise, be manufactured and/or cast as a single body (not shown). The main body 34 and the inlet sub body 35 may be formed together to define a unitary body. Manufacturing the valve housing 12 as a single body may aid the manufacture process as less subsequent assembly is required.

The valve housing 12 may comprise a housing screw thread 37. The housing screw thread 37 may be defined in the inlet sub body 35 and/or the main body 34. The housing screw thread 37 may be an internal thread defined on an inner surface of the housing wall 21. The housing screw thread 37 may engage with the locking member 16 as described herein below.

The valve housing 12 may comprise an inlet groove or flange 38 and/or an outlet groove or flange 39. The inlet and outlet grooves or flanges 38, 39 may comprise grooves or flanges extending into or from the housing wall 21 in the radial direction 33 at the valve inlet 23 and the valve outlet 25, respectively. The inlet groove or flange 38 and outlet groove or flange 39 aid connection of the inlet device 5 and the outlet device 7 to the dart valve 10, respectively.

Figure 3A:
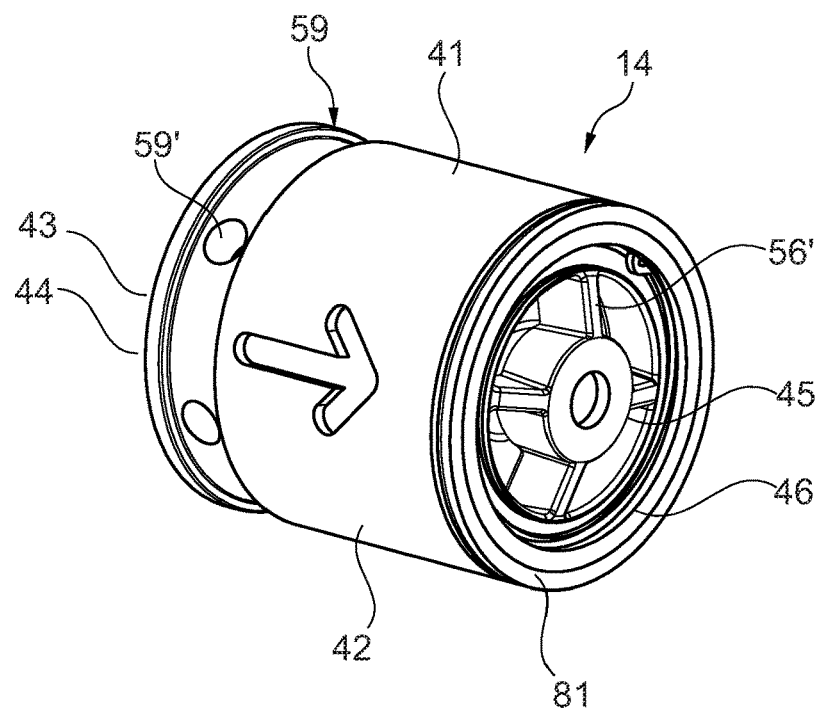
Figure 3B:
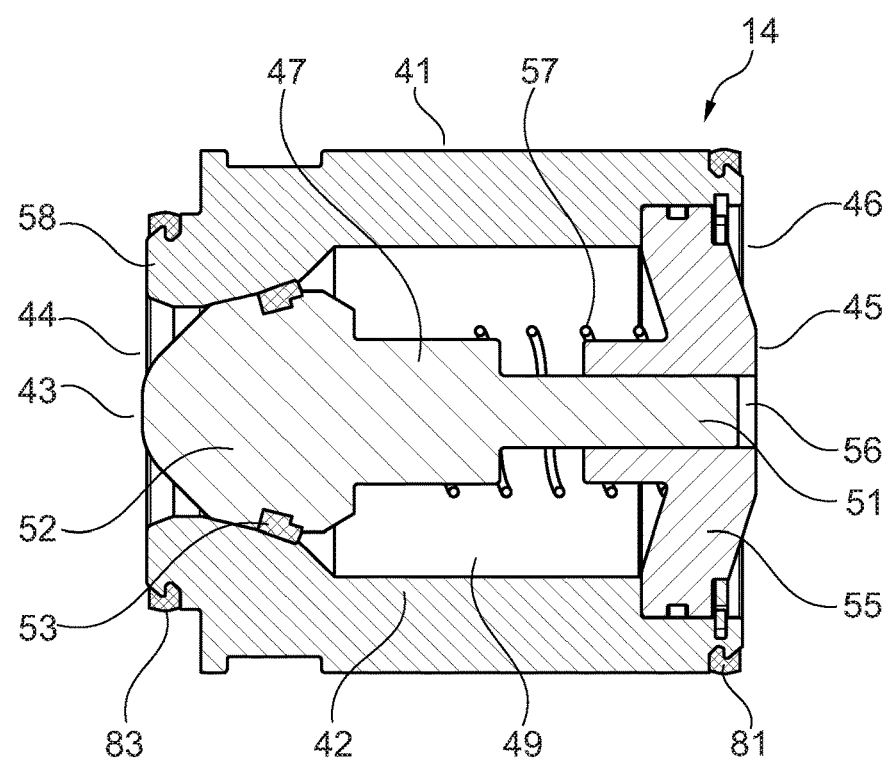

The valve cartridge 14 comprises a cartridge housing 41, which is shown in further detail in FIGS. 3*a* and 3*b*. The cartridge housing 41 may comprise a cartridge wall 42. The cartridge wall 42 may be generally cylindrical in shape. The cartridge wall 42 may be a solid wall and/or a thin-walled tube. The cartridge wall 42 may be formed of multiple components but is generally referred to as the cartridge wall 42. The cartridge wall 42 may comprise a cylindrical and/or side outer surface and two opposing end faces extending perpendicular to the outer surface.

The cartridge housing 41 is configured to allow fluid to flow therethrough from a cartridge inlet 43 to a cartridge outlet 45. The valve cartridge 14 may be tubular and/or have a generally cylindrical shape.

The valve cartridge 14 comprises a cartridge chamber 49. The cartridge wall 42 may define the cartridge chamber 49, which extends from the cartridge inlet 43 to the cartridge outlet 45. The cartridge wall 42 may extend from the cartridge inlet 43 to the cartridge outlet 45 along the longitudinal axis 31. The cartridge wall 42 may extend between a locking member end 44 and a housing end 46. The locking member end 44 may be, and/or be proximal to, the cartridge inlet 43. The housing end 46 may be, and/or be proximal to, the cartridge outlet 45. The locking member end 44 and the housing end 46 may be reversed in relation to the cartridge inlet 43 and cartridge outlet 45 if the locking member 16 is mounted in the valve housing 12 closer to the valve outlet 25 as compared with the valve cartridge 14.

The valve cartridge 14 further comprises a valve plunger 47 slidably mounted in the cartridge housing 41, particularly in the cartridge chamber 49. The valve plunger 47 is located between the cartridge inlet 43 and the cartridge outlet 45. The valve plunger 47 may be slidable along the longitudinal axis 31.

The valve plunger 47 is configured to selectively allow fluid to flow from the cartridge inlet 43 to the cartridge outlet 45. The valve plunger 47 may be configurable in an open position and in a closed position. In the open position, fluid may be able to flow from the cartridge inlet 43 to the cartridge outlet 45. In the closed position, fluid may not be able to flow from the cartridge inlet 43 to the cartridge outlet 45.

The valve plunger 47 may comprise a stem portion 51 and a head portion 52. The head portion 52 may extend outwardly (e.g., in the radial direction 33) from the stem portion 51. The head portion 52 may be configured to engage the cartridge wall 42 and/or to seal the cartridge chamber 49 proximal to the cartridge inlet 43, when the valve plunger 47 is in the closed position. The valve plunger 47 may comprise a plunger seal interface and/or a plunger radial seal member 53. The plunger seal interface may comprise metal to metal contact. The plunger radial seal member 53 may extend around the circumference of the valve plunger 47 (e.g., the head portion 52). The plunger radial seal member 53 may form a seal between the valve plunger 47 (e.g., the head portion 52) and the cartridge wall 42, when the valve plunger 47 is in the closed position. The plunger radial seal member 53 may be an elastomeric and/or rubber member.

The valve cartridge 14 may comprise a valve plunger guide 55. The valve plunger guide 55 may be mounted to the cartridge housing 41 and/or the cartridge wall 42. The valve plunger guide 55 may be mounted proximal to the cartridge outlet 45. The valve plunger 47 may be slidably mounted to the valve plunger guide 55. The valve plunger guide 55 may comprise a central aperture 56. The stem portion 51 of the valve plunger 47 may be slidably mounted in the central aperture 56. The valve plunger guide 55 may comprise a plurality of apertures through which fluid may flow. The valve plunger guide 55 may comprise struts 56' mounted to the cartridge housing 41 and/or the cartridge wall 42. The valve plunger guide 55 may allow fluid to flow therethrough and/or may not seal the cartridge chamber 49 at the cartridge outlet 45.

The valve cartridge 14 may further comprise a resilient member 57. The resilient member 57 may be arranged to bias the valve plunger 47 from the open position towards the closed position. The resilient member 57 may engage with the valve plunger guide 55 and/or the valve plunger 47. The resilient member 57 may be a spring.

The valve cartridge 14 is configured to be inserted through the aperture 27 of the valve housing 12 for removably mounting the valve cartridge 14 within the valve housing 12 in the mounted position. The valve cartridge 14 may be mounted within the housing chamber 29 and/or to the valve housing 12. The mounted position is shown, for example, in FIG. 2a and is such that the valve inlet 23 is in communication with the cartridge inlet 43, and the cartridge outlet 45 is in communication with the valve outlet 25. In the mounted position, fluid is able to flow from the valve inlet 23 to the valve outlet 25 through the valve cartridge 14. In the mounted position, a flow path may extend from the valve inlet 23, through the cartridge chamber 49, to the valve outlet 25.

The valve cartridge 14 may comprise a cartridge annular projection 58 at the cartridge inlet 43 and/or no annular projection at the cartridge outlet 45. The cartridge annular projection 58 may be an annular projection that extends, optionally towards the inlet side of the valve housing 12, from an end face of the valve cartridge 14. The cartridge annular projection 58 may ensure that the valve cartridge 14 is mounted within the housing chamber 29 in the correct orientation, such that fluid is able to flow from the valve inlet 21 to the valve outlet 23. The seal formed between the plunger radial seal member 53 and the valve plunger 47, described above, may be defined on an inner portion of the cartridge annular projection 58 (e.g., along a portion of the cartridge annular projection 58 that is narrower (smaller inner diameter) than one or more other portions of the cartridge chamber 49).

The valve cartridge 14 may comprise a cartridge mount 59 for engaging a cartridge removal tool 69 (shown in FIGS. 4b and 5) for aiding removal of the valve cartridge 14 from the valve housing 12. The cartridge mount 59 may comprise at least one hole in the cartridge wall 42, such as a plurality of radially extending holes 59' in the cartridge wall 42 as illustrated. The cartridge mount 59 may comprise a groove with the plurality of radially extending holes 59' located therein.

The cartridge removal tool 69 may comprise at least one mount 71 engageable with the cartridge mount 59 and/or a handle 73 to be held by a user. The cartridge removal tool 69 is described in more detail below.

Figure 4A:
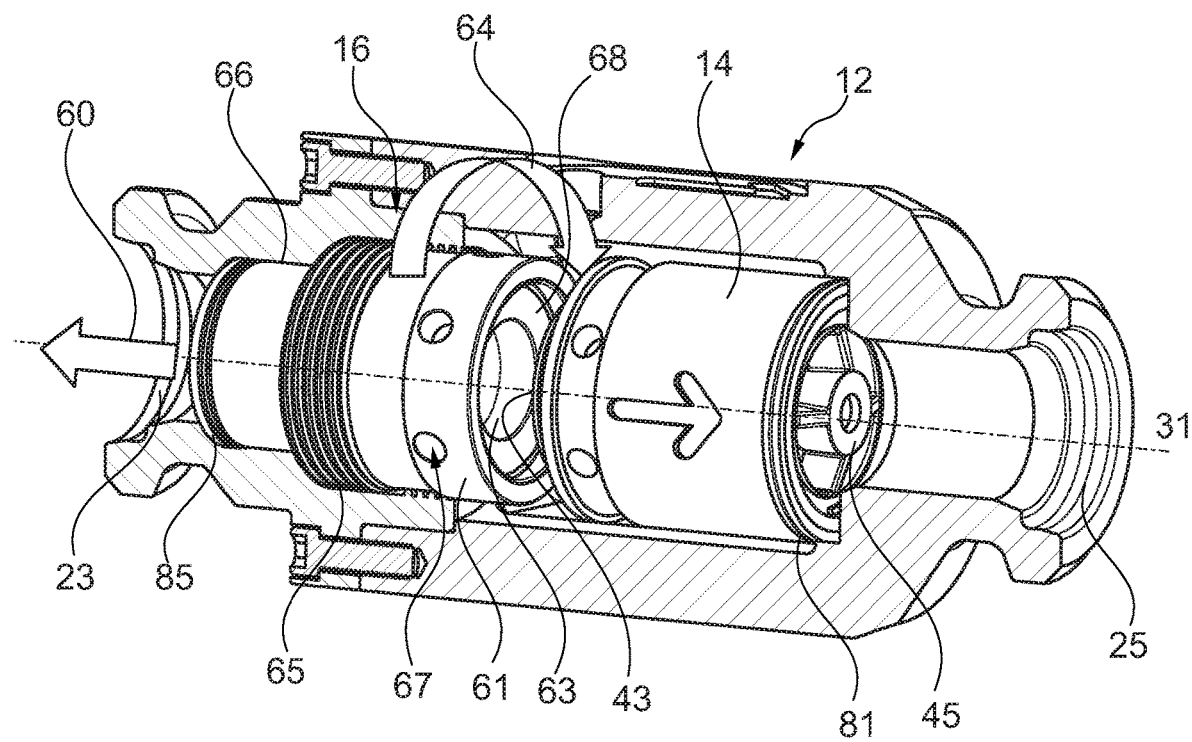
FIG. 4a is a perspective view of the dart valve of FIG. 2a in a position other than the mounted position.
Figure 4B:
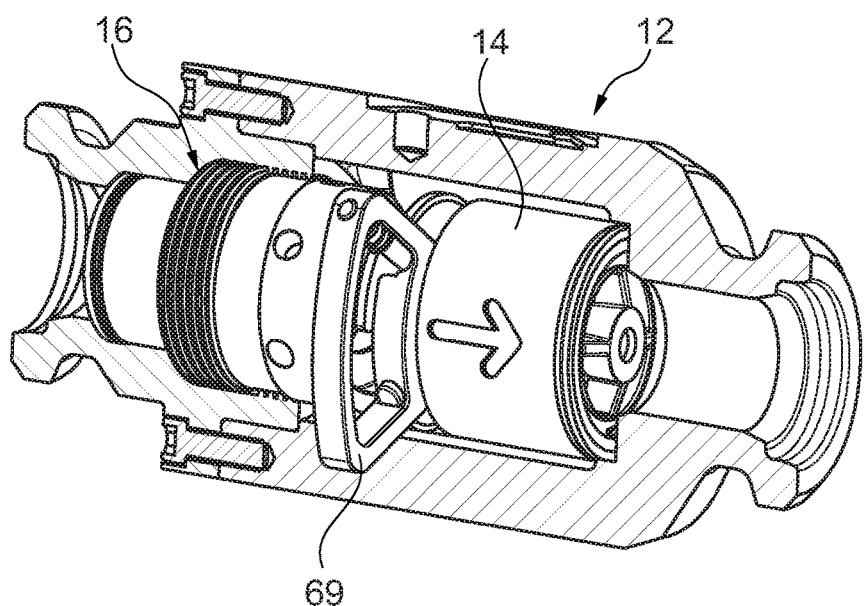
FIG. 4b is a further perspective view of the dart valve of FIG. 2a in a position other than the mounted position.

As shown in FIG. 4a, the locking member 16 is mountable within the valve housing 12. The locking member 16 is mounted within the housing chamber 29 and/or mounted to the valve housing 12. The locking member 16 may be mounted between the valve inlet 23 and the cartridge inlet 43, or between the cartridge outlet 45 and the valve outlet 25.

The locking member 16 may be movable, in forward and reverse, along the longitudinal axis 31, as indicated by arrow 60. The locking member 16 may comprise a locking member wall 61 that defines a locking member chamber 63. The locking member chamber 63 may be embodied as a central bore through the locking member 16. The locking member wall 61 may be generally cylindrical in shape. The locking member wall 61 way be a solid wall. The locking member wall 61 may be a thin-walled tube. The locking member wall 61 may be formed of multiple components but is generally referred to as the locking member wall 61.

The locking member 16 may comprise a locking member screw thread 65 on an outer surface of the locking member 16. The locking member screw thread 65 and the housing screw thread 37 may be engaged and/or engageable with one another. Due to engagement between the housing screw thread 37 and the locking member screw thread 65, rotating the locking member 16, as indicated by arrow 64, may cause the locking member 16 to move along the longitudinal axis 31.

The locking member 16 may be for locking the valve cartridge 14 into the mounted position. The valve cartridge 14 may be locked into the mounted position by moving the locking member 16 along the longitudinal axis 31 towards the valve cartridge 14, such as by unscrewing the locking member screw thread 65 and the housing screw thread 37.

The valve cartridge 14 may be unlocked from the mounted position by moving the locking member 16 along the longitudinal axis 31 away from the valve cartridge 14, such as by screwing the locking member screw thread 65 and the housing screw thread 37 together.

The locking member screw thread 65 and the housing screw thread 37 may comprise a right-hand thread such that unscrewing the threads moves the locking member 16 along the longitudinal axis 31 towards the valve cartridge 14 as explained above. The locking member screw thread 65 and the housing screw thread 37 may comprise a left-hand thread such that screwing the threads together moves the locking member 16 along the longitudinal axis 31 towards the valve cartridge 14 in the opposite sense to that described above.

Other mechanisms may be used to move the locking member 16 along the longitudinal axis 31 and lock the valve cartridge 14 in the mounted position. For example, guide rails may be provided in the valve housing 12 along which the locking member 16 slides.

The locking member 16 may comprise retractable friction members which engage the valve housing 12 and/or prevent movement of the locking member 16. The locking member 16 and valve housing 12 may comprise a ratchet and pawl mechanism to allow movement of the locking member 16 along the longitudinal axis 31 and lock the valve cartridge 14 in the mounted position.

In the mounted position, the locking member 16 and valve cartridge 14 may be mounted to one another. In the mounted position, a flow path may extend from the valve inlet 23, through the locking member chamber 63 and cartridge chamber 49, to the valve outlet 25. In the mounted position, the valve inlet 23 may be in communication with the cartridge inlet 43 via the locking member chamber 63, and the valve outlet 25 may be in communication with the cartridge outlet 45 via the locking member chamber 63.

In the mounted position, the housing end 46 of the valve cartridge 14 may engage the valve housing 12, and the locking member end 44 of the valve cartridge 14 may engage the locking member 16. As illustrated, the housing end 46 of the valve cartridge 14 may be proximal the cartridge outlet 45 and the locking member end 44 of the valve cartridge 14 may be proximal the cartridge inlet 43. Alternatively, the housing end 46 of the valve cartridge 14 may be proximal the cartridge inlet 43 and the locking member end 44 of the valve cartridge 14 may be proximal the cartridge outlet 45, depending on whether the locking member 16 is mounted between the valve inlet 23 and the cartridge inlet 43, or between the cartridge outlet 45 and the valve outlet 25.

As shown most clearly in FIG. 2a, the locking member 16 may comprise a locking member annular projection 66. The locking member annular projection 66 may extend from a threaded portion 62 of the locking member 16. The threaded portion 62 may comprise the locking member screw thread 65. The locking member annular projection 66 and the threaded portion 62 may both be tubular bodies. The threaded portion 62 may have a greater thickness than the locking member annular projection 66. The locking member 16 may comprise a first end face adjacent to the locking member screw thread 65 and/or extending perpendicularly from the outer surface in which the locking member screw thread 65 is formed. The locking member annular projection 66 may extend from the first end face. The locking member annular projection 66 may extend along the longitudinal axis 31. The locking member annular projection 66 may be configured to fit closely to the housing wall 21 and/or provide a smooth flow path from the valve inlet 23 to the valve cartridge 14. If the locking member 16 did not comprise the locking member annular projection 66, then, in the mounted, position, the flow path may include the housing screw thread 37 as it passes through the valve housing 12. Therefore, the locking member annular projection 66 may cover the housing screw thread 37 to provide a smooth flow path. The locking member annular projection 66 may also protect the housing screw thread 37 from any detrimental effect of the fluid (e.g., erosion and/or accumulation of debris).

The locking member 16 may comprise a locking member annular shoulder 68. The locking member annular shoulder 68 may be at one end of the locking member 16. The locking member annular shoulder 68 may be at an opposite end of the locking member 16 to the locking member annular projection 66. The locking member annular shoulder 68 may form a recess within the locking member 16 and/or may be formed in a second end face of the locking member 16. The second end face may be opposite the first end face and/or extend perpendicularly from the outer surface of the locking member 16. The locking member annular shoulder 68 may be configured to fit closely to the valve cartridge 14 and/or the cartridge annular projection 58 of the valve cartridge 14. The locking member annular shoulder 68 may aid holding the valve cartridge 14 in place in the mounted position.

The locking member 16 may comprise at least one locking member mount 67. The locking member mount 67 may be for engaging an engaging tool (not shown) for rotating the locking member 16 (e.g., to move the locking member 16 along the longitudinal axis 31 via the engagement between the locking member screw thread 65 and housing screw thread 37). The engaging tool may be a bar. The locking member mount 67 may comprise at least one radially extending hole 67'. The engaging tool may be inserted into a first radially extending hole, of the at least one radially extending hole 67', to aid rotation and/or movement of the locking member 16 (e.g., so that the valve cartridge 14 is no longer locked in the mounted position).

The locking member mount 67 may be for engaging a stop tool 69' for preventing movement of the locking member 16 (shown most clearly in FIG. 2b). The present disclosure, therefore, further provides an apparatus 9 comprising the dart valve 10 and the stop tool 69'.

Figure 5:
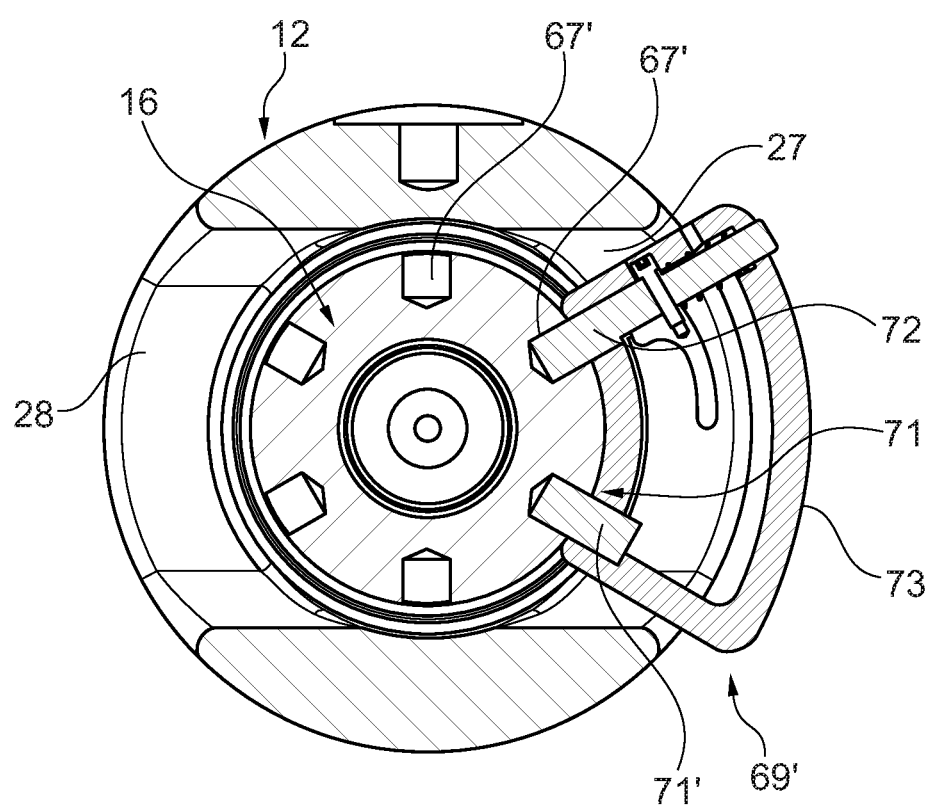

As shown in FIG. 5, the stop tool 69' may comprise at least one mount 71 engageable with and/or complementary to the locking member mount 67 and/or a stop body 73. The at least one mount 71 may comprise at least one protrusion, and/or pin, 71' engageable with the at least one radially extending hole 67'. The at least one protrusion 71' may correspond to the at least one radially extending hole 67' and/or be configured to fit the at least one radially extending hole 67' with a small clearance.

The stop body 73 may be for contacting edges of the aperture 27. The stop body 73 may be present such that the stop body 73 prevents movement of the locking member 16. When mounted, the stop tool 69' may not be in contact with the edges of the aperture 27 and/or may allow the locking member 16 to move slightly before preventing movement of the locking member 16. This may make it easier for the stop tool 69' to be engaged with the locking member mount 67.

As shown in FIG. 5, the at least one protrusion 71' may include a moveable protrusion, and/or movable pin, 72 which may be moveable relative to the stop body 73 for selectively engaging the at least one radially extending hole 67'. The moveable protrusion 72 may be formed of a longitudinal member inserted through a bore in the stop body 73. The moveable protrusion 72 may comprise a resilient member and/or spring to bias the longitudinal member towards an extended position for engaging the at least one radially extending hole 67'. The moveable protrusion 72 may further comprise a handle and/or trigger for aiding a user to retract the moveable protrusion 72. The stop tool 69' may comprise a fixed protrusion 71', which may be inserted into a first radially extending hole 67', and the moveable protrusion 72 which may be inserted into a second radially extending hole 67' for fixing the stop tool 69' to the locking member 16. The stop tool 69' may be fixed to the locking member 16 by the first and second radially extending holes 67' extending non-parallel to each other. As a result, when both protrusions 71', 72 are engaged by the stop tool 69', the stop tool 69' cannot be removed without withdrawing the moveable protrusion 72 from the second radially extending hole 67'. This may ensure that the locking member 16 cannot move from the mounted position as the stop tool 69' remains fixed to the locking member 16.

The stop tool 69' may be the same tool as the cartridge removal tool 69 described above, as shown in FIG. 4*b*. The stop body 73 may be the same as the handle 73. The same tool may be used to prevent movement of the locking member 16 and aid removal of the cartridge 14. In other embodiments, the stop tool 69' and the cartridge removal tool 69 may be separate and/or distinct tools.

As best shown in FIGS. 2*a*, 3*a*, 3*b*, and 4*a*, the valve cartridge 14 and/or the valve housing 12 may comprise at least one housing sealing interface 81. The at least one housing sealing interface 81 may be configured to form a seal between the valve cartridge 14 and the valve housing 12. In the mounted position, the at least one housing sealing interface 81 may form a seal between the valve cartridge 14 and the valve housing 12. The at least one housing sealing interface 81 may comprise a radial seal member extending around the circumference of the valve cartridge 14. The housing sealing interface 81 may be at the housing end 46 of the valve cartridge 14. The housing sealing interface 81 may extend along an edge between the end face and the outer side surface of the cartridge wall 42. The housing sealing interface 81 may be located proximal to the valve outlet 45. The housing sealing interface 81 may be located on an external surface of the valve cartridge 14.

The valve cartridge 14 and/or the locking member 16 may comprise at least one locking member sealing interface 83. The at least one locking member sealing interface 83 may be configured to form a seal between the valve cartridge 14 and the locking member 16. In the mounted position, the at least one locking member sealing interface 83 may form a seal between the locking member 16 and the valve cartridge 14 and/or between the cartridge annular projection 58 and the locking member annular shoulder 68. The at least one locking member sealing interface 83 may comprise a radial seal member extending around the circumference of the valve cartridge 14. The at least one locking member sealing interface 83 may be at the locking member end 44 of the valve cartridge 14. The at least one locking member sealing interface 83 may be mounted to the cartridge annular projection 58. The locking member sealing interface 83 may extend along an edge between an end face and an outer side surface of the cartridge annular projection 58. The locking member sealing interface 83 may extend along an edge between the end face and the outer side surface of the cartridge wall 42. The locking member sealing interface 83 may be located proximal to the valve inlet 43. The locking member sealing interface 83 may be mounted to the valve cartridge 14 at the opposite end to the housing sealing interface 81. The locking member sealing interface 83 may be located on an external surface of the valve cartridge 14.

As shown in FIG. 2*a*, the locking member 16 may comprise a second housing sealing interface 85. The second housing sealing interface 85 may be configured to form a seal between the locking member 16 and the valve housing 12. The second housing sealing interface 85 may comprise a radial seal member extending around the circumference of the locking member 16. The second housing sealing interface 85 may be mounted to the locking member annular projection 66. The second housing sealing interface 85 may extend along an edge between an end face and an outer side surface of the locking member annular projection 66. The second housing sealing interface 85 may extend along an edge between an end face and an outer side surface of the locking member 16. The second housing sealing interface 85 may be located on an external surface of locking member 16. The second housing sealing interface 85 may prevent fluid from entering into contact with the housing screw thread 37.

The housing sealing interface 81, locking member sealing interface 83 and/or second housing sealing interface 85 may each be an elastomeric and/or rubber member. The housing sealing interface 81, locking member sealing interface 83 and/or second housing sealing interface 85 may each be thin and/or circular members. The housing sealing interface 81, locking member sealing interface 83 and/or second housing sealing interface 85 may each comprise a groove corresponding to a notch on the valve cartridge 14 and/or locking member 16 to which they may be mounted.

The aforementioned sealing interfaces may ensure that the flow path extending from the valve inlet 23, through the locking member chamber 63 and cartridge chamber 49, to the valve outlet 25 is a sealed flow path. The aforementioned sealing interfaces may ensure that fluid entering the valve inlet 23 may only exit via the valve outlet 25 when the dart valve 10 is fully assembled.

INDUSTRIAL APPLICABILITY

The dart valve 10 described above may allow for internal components to be replaced easily. The valve cartridge 14 containing the valve plunger 47 is replaceable without having to disconnect the valve housing 12 of the dart valve 10 from surrounding flow iron (e.g., pipes, valves, and/or pumps). For example, the valve cartridge 14 may be replaced as follows:

The stop tool 69' may be removed from engagement with the locking member 16. This may be accomplished by withdrawing the moveable protrusion 72 from the first radially extending hole 67'. Then the fixed protrusion 71' may be removed from the second radially extending hole 67' by extracting the stop tool 69' from the locking member 16.

The locking member 16 may then be moved from the mounted position. The locking member 16 may be rotated such that the housing and locking member screw threads 37, 65 cause the locking member 16 to move along the longitudinal axis 31 away from the valve cartridge 14. The engaging tool may be used to aid rotation of the locking member 16. Moving the locking member 16 may release the valve cartridge 14 from the mounted position.

The valve cartridge 14 may be removed from the valve housing 12. The valve cartridge 14 may be removed via the aperture 27. The valve cartridge 14 may be removed using the cartridge removal tool 69. The cartridge removal tool 69 may be engaged with the valve cartridge 14. This may be accomplished by inserting the fixed protrusion 71' into a second radially extending hole 59' of the valve cartridge 14, by moving the cartridge removal tool 69 towards the valve cartridge 14. Then the moveable protrusion 72 may be inserted into a first radially extending hole 59' to lock the cartridge removal tool 69 to the valve cartridge 14. The valve cartridge 14 may then be removed, aided by the handle 73 of the cartridge removal tool 69.

A second valve cartridge 14 may then be inserted into the valve housing 12. The valve cartridge 14 may be inserted via the aperture 27. The valve cartridge 14 may be mounted such that the housing end 46 is in contact with the valve housing 12.

The locking member 16 may then be moved back into the mounted position. The locking member 16 may be rotated such that the housing and locking member screw threads 37, 65 cause the locking member 16 to move along the longitudinal axis 31 towards the second valve cartridge 14. The locking member 16 may be moved until the locking member end 44 of the valve cartridge 14 is in contact with the locking member 16. The engaging tool may be used to aid rotation of the locking member 16. Moving the locking member 16 may lock the second valve cartridge 14 into the mounted position.

The stop tool 69' may be re-engaged with the locking member 16. This may be accomplished by inserting the fixed protrusion 71' into the second radially extending hole 67', by moving the stop tool 69' towards the locking member 16. Then the moveable protrusion 72 may be inserted into a first radially extending hole 67' to lock the stop tool 69' to the locking member 16. The stop body 73 may then prevent the locking member 16 from rotating by contacting the edges of the aperture 27 and thus keep the locking member 16 and the second valve cartridge 14 in the locked position.

The aperture 27 may allow internal components, such as the valve plunger 47, to be replaced without disconnecting the flow devices 3, which are connected to the dart valve 10 during use, from the dart valve 10. This benefit may be realized because the valve cartridge 14 may be removed through the aperture 27 without disconnecting the flow devices 3 from the valve inlet 23 and valve outlet 25.

The locking member 16 may enable for the valve cartridge 14 to be locked into place such that the dart valve 10 forms a flow path extending from the valve inlet 23, through the locking member chamber 63 and cartridge chamber 49, to the valve outlet 25. Based on the sealing interfaces, the flow path may be a sealed flow path.

The screw threads 37, 65 enable the locking member 16 to be moved along the longitudinal axis 31 to lock and unlock the valve cartridge 14 to the mounted position by rotating the locking member 16.

Based on the sealing interfaces comprising radial seals, the sealing interfaces may be able to move slightly without breaking the seal. This allows the stop tool 69' not to be in tight contact with the edges of the aperture 27 at least in part because the seal interface is maintained even if the locking member 16 rotates slightly.

The invention claimed is:

1. A dart valve comprising:
    a valve housing comprising a valve inlet, a valve outlet, a housing wall and an aperture extending through the housing wall between the valve inlet and valve outlet; and
    a valve cartridge comprising:
        a cartridge housing configured to allow fluid to flow therethrough from a cartridge inlet to a cartridge outlet, wherein a wall of the cartridge housing consists of a unitary body extending from the cartridge inlet to the cartridge outlet; and
        a valve plunger slidably mounted in the cartridge housing and configured to selectively allow fluid to flow from the cartridge inlet to the cartridge outlet, wherein the valve cartridge is configured to be inserted through the aperture for removably mounting the valve cartridge within the valve housing, in a mounted position, such that the valve inlet is in communication with the cartridge inlet, the cartridge outlet is in communication with the valve outlet and fluid is able to flow from the valve inlet to the valve outlet through the valve cartridge.

2. The dart valve of claim 1, wherein the dart valve is configured for fluid to flow from the valve inlet to the valve outlet along a flow direction, wherein the aperture extends through the housing wall in a radial direction, and wherein the radial direction is a direction perpendicular to the flow direction.

3. The dart valve of claim 1, wherein one or more of the valve cartridge or the valve housing further comprises at least one housing sealing interface configured to form a seal between the valve cartridge and the valve housing.

4. The dart valve of claim 3, wherein the valve cartridge comprises the at least one housing sealing interface, and wherein the at least one housing sealing interface comprises a radial seal member extending around the circumference of the valve cartridge at a housing end of the valve cartridge.

5. The dart valve of claim 1, further comprising a locking member mounted within the valve housing, wherein the locking member is movable along a longitudinal axis of the valve housing for locking the valve cartridge into the mounted position, and wherein, in the mounted position, a housing end of the valve cartridge engages the valve housing and a locking member end of the valve cartridge engages the locking member.

6. The dart valve of claim 5, wherein one or more of the valve cartridge or the locking member comprises at least one locking member sealing interface configured to form a seal between the valve cartridge and the locking member.

7. The dart valve of claim 6, wherein the valve cartridge comprises the at least one locking member sealing interface, and wherein the at least one locking member sealing interface comprises a radial seal member extending around the circumference of the valve cartridge at a locking member end of the valve cartridge.

8. The dart valve of claim 5, wherein the locking member comprises at least one locking member mount configured for one or more of:
    engaging an engaging tool for moving the locking member along the longitudinal axis, or
    engaging a stop tool for preventing movement of the locking member.

9. The dart valve of claim 8, wherein the locking member mount comprises at least one radially extending hole, and the dart valve further comprises the stop tool, wherein the stop tool comprises at least one protrusion, engageable with the at least one radially extending hole, and a stop body for contacting edges of the aperture to prevent movement of the locking member.

10. The dart valve of claim 9, wherein the at least one protrusion is moveable relative to the stop body for selectively engaging the at least one radially extending hole.

11. The dart valve of claim 5, wherein the locking member comprises a locking member chamber, and wherein one or more of:
    the valve inlet is in communication with the cartridge inlet via the locking member chamber, or the valve outlet is in communication with the cartridge outlet via the locking member chamber.

12. The dart valve of claim 1, wherein the valve cartridge further comprises a resilient member arranged to bias the valve plunger from an open position towards a closed position, and wherein:
in the open position, fluid is able to flow from the cartridge inlet to the cartridge outlet, and
in the closed position, fluid is not able to flow from the cartridge inlet to the cartridge outlet.

13. A dart valve comprising:
a valve housing comprising:
a housing wall defining a housing chamber extending from a valve inlet to a valve outlet; and
an aperture extending through the housing wall and located between the valve inlet and valve outlet;
a valve cartridge mounted within the housing chamber and to the valve housing, the valve cartridge comprising a valve plunger slidably mounted in a cartridge chamber of the valve cartridge;
a locking member comprising a locking member chamber, the locking member mounted within the housing chamber and mounted to the valve housing, wherein:
the locking member and valve cartridge are mounted to one another; and
a flow path extends from the valve inlet, through the locking member chamber and cartridge chamber, to the valve outlet.

14. The dart valve of claim 13, wherein the housing chamber extends from the valve inlet to the valve outlet along a flow direction, wherein the aperture extends through the housing wall in a radial direction, and wherein the radial direction is a direction perpendicular to the flow direction.

15. The dart valve of claim 13, further comprising a housing radial seal member extending around the circumference of the valve cartridge at a housing end of the valve cartridge.

16. The dart valve of claim 13, further comprising a locking member radial seal member extending around the circumference of the valve cartridge at a locking member end of the valve cartridge.

17. The dart valve of claim 13, wherein:
the locking member comprises a locking member screw thread on an outer surface;
the valve housing comprises a housing screw thread on an inner surface; and
the locking member screw thread and the housing screw thread are engaged.

18. A valve cartridge for mounting in a dart valve, the valve cartridge comprising:
a cartridge housing comprising a cartridge wall defining a cartridge chamber extending from a cartridge inlet to a cartridge outlet, wherein the cartridge wall consists of a unitary body from the cartridge inlet to the cartridge outlet;
a valve plunger slidably mounted within the cartridge chamber and located between the cartridge inlet and the cartridge outlet;
a housing radial seal member extending around the circumference of the valve cartridge at a first end of the valve cartridge; and
a locking member radial seal member extending around the circumference of the valve cartridge at a second end of the valve cartridge.

19. The valve cartridge of claim 18, further comprising a plurality of radially extending holes in the cartridge wall.

20. The valve cartridge of claim 18, further comprising:
a valve plunger guide mounted to the cartridge housing, wherein the valve plunger is slidably mounted to the valve plunger guide;
a resilient member engaging the valve plunger and the valve plunger guide; and
a plunger radial seal member extending around the circumference of the valve plunger.

* * * * *